No. 898,036. PATENTED SEPT. 8, 1908.
L. BURG.
VEHICLE SHAFT.
APPLICATION FILED JAN. 27, 1908.
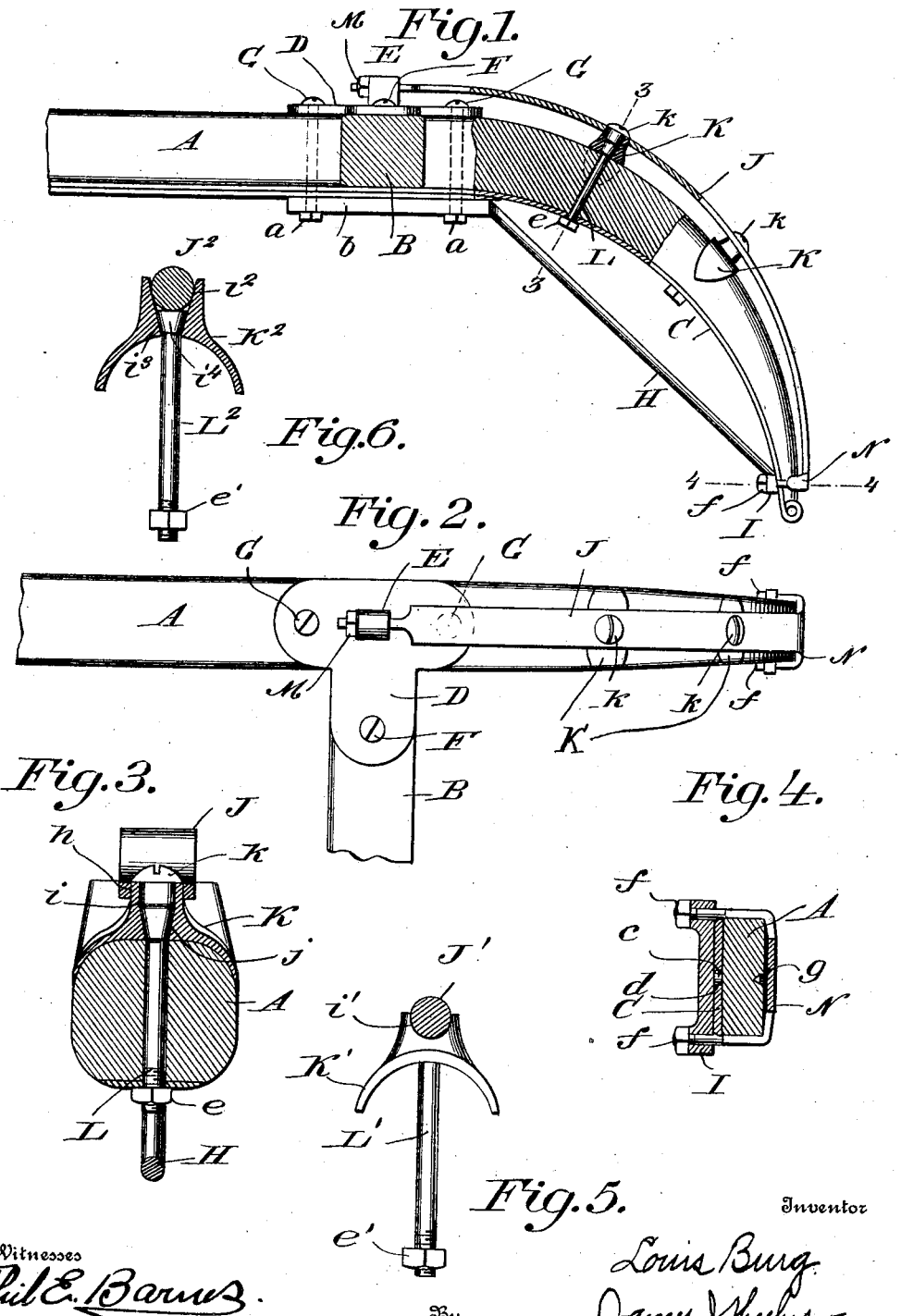
Witnesses
Phil E. Barnes
J. J. Sheehy Jr.
Inventor
Louis Burg
By James Sheehy
Attorney

UNITED STATES PATENT OFFICE.

LOUIS BURG, OF DALLAS CITY, ILLINOIS.

VEHICLE-SHAFT.

No. 898,036.　　　　Specification of Letters Patent.　　　　Patented Sept. 8, 1908.

Application filed January 27, 1908.　Serial No. 412,869.

*To all whom it may concern:*

Be it known that I, LOUIS BURG, citizen of the United States, residing at Dallas City, in the county of Hancock and State of Illinois, have invented new and useful Improvements in Vehicle-Shafts, of which the following is a specification.

My invention relates to vehicle shafts; and it has for its object to provide simple, inexpensive and easily applied and adjusted means for lending stiffness and strength to the heel portions of shafts with a view of precluding breaking or splitting thereof in the event of a horse suddenly jumping forward or moving backward.

With the foregoing in mind the invention will be fully understood from the following description and claims when the same are read in connection with the drawings, accompanying and forming part of this specification, in which:

Figure 1 is a view partly in side elevation and partly in section showing a shaft or thill and a cross-bar equipped with my novel stiffening and strengthening means; Fig. 2, a plan view of the same; Fig. 3, a cross-section taken in the plane indicated by the line 3—3 of Fig. 1; Fig. 4, a cross-section taken in the plane indicated by the line 4—4 of Fig. 1, looking downward; Fig. 5, a cross-section illustrating a modified construction hereinafter referred to in detail, and Fig. 6, a view similar to Fig. 5 of another modification.

Referring by letter to the said drawings, and more particularly to Figs. 1 to 4 thereof: A is a shaft or thill, B, a cross-bar let into the shaft or thill, and C a shaft or thill iron, all of which may be and preferably are of the ordinary well known construction.

D is a T-plate arranged on the shaft and cross-bar in the manner best shown in Fig. 2, and having a longitudinally disposed and smooth apertured projection E on its portion above the shaft.

F is a bolt which extends through and connects the inwardly directed portion of the T-plate and the cross-bar B, and G G are bolts which extend through and connect the longitudinally disposed portion of the T-plate and the shaft and are equipped at their lower ends with nuts $a$. The bolts G also serve for the connection to the shaft and thill iron of the upper and forward horizontal portion $b$ of the inclined brace bar H which terminates at its lower and rear end in a T-head I having on its side opposed to the thill iron a teat $c$ which enters a socket $d$ in the thill iron, Fig. 4, and thereby effectually prevents casual movement of the brace bar with respect to the thill iron.

In addition to the elements thus far specified my novel strengthening and stiffening means comprises a stay-bar J, saddles K, Figs. 1 and 3, bolts L equipped with nuts $e$, and an adjusting nut M, Figs. 1 and 2. The stay-bar J is provided at its lower and rear end with a clip or shackle N which straddles the shaft and thill iron at a point adjacent to the eye of the latter and has its legs extended through the T-head I of the brace bar and provided with nuts $f$. The said clip or shackle N is also provided as shown in Fig. 4 with a teat $g$ which is socketed in the shaft and thereby effectually prevents slipping or casual movement of the clip or shackle on the shaft. The upper and forward portion of the stay-bar which is threaded and extends through the smooth aperture of the projection E on the T-plate D is provided at a point in front of the projection with the before mentioned nut M through the medium of which the stay-bar may obviously be tightened to the extent desired when occasion demands. At intervals of its length the stay-bar J is provided with apertures $h$, Fig. 3, which receive the upwardly extended tubular portions $i$ of the saddles K. The said saddles K straddle and reinforce the shaft and also serve by reason of their tubular portions $i$ being disposed in the stay-bar to hold said stay-bar against lateral movement. The lower portions of the bores in the saddles are tapered, as indicated by $j$ in Fig. 3, and hence it will be manifest that the downward movement of the correspondingly tapered bolts L is limited so that the bolts will rest in the positions illustrated—*i. e.*, with their heads $k$ bearing snug against the upper ends of the tubular portions $i$ of the saddles. The stay-bar J is held against upward movement by the clip or shackle N and the arrangement of the upper and forward end of the bar in the projection E on the T-plate D, and consequently the stay-bar is engaged with the tubular portions of the saddles K merely to render the construction neat and compact and, as before stated, to preclude casual lateral movement of the stay-bar.

It will be gathered from the foregoing that the construction described will enable the shaft and the cross-bar to withstand shock and strain in all directions and consequently will materially prolong the usefulness of the shaft and cross-bar and at the same time effectually prevent the accidents usually attendant upon a broken shaft or cross-bar.

In Fig. 5 I have illustrated a modified type of saddle K' which differs from the saddles K of Figs. 1 to 3 in that it has a seat $i'$ in its upper side to receive a stay-bar J' of circular form in cross-section, and also in that it has an integral bolt L' equipped at its lower end with a nut $e'$.

In Fig. 6 I show another modified saddle $K^2$ which is peculiar in that it has a seat $i^2$ to receive a stay-bar $J^2$, of circular form in cross-section, and a countersink $i^3$ disposed below the seat $i^2$. The said countersink is designed to receive the tapered head $i^4$ of a bolt $L^2$ which is separable from the saddle and is provided at its lower end with a nut $e'$.

When deemed expedient by the manufacturer of my invention saddles such as shown in Fig. 5 or saddles such as shown in Fig. 6 and a stay-bar of circular form in cross-section may be substituted for the corresponding elements shown in Figs. 1 to 3 without involving departure from the scope of my invention as defined in the claims appended; the embodiment disclosed in Fig. 6 being preferable to that shown in Fig. 5 because of the facility with which the former may be manufactured.

Having described my invention, what I claim and desire to secure by Letters-Patent, is:

1. The combination with the heel portion of a vehicle shaft, of an inclined brace bar disposed under the shaft and connected at its ends therewith, a plate connected with and arranged on the shaft and also connected with the forward portion of the brace bar and having an apertured projection, a stay-bar arranged above and curved correspondingly to the shaft and connected at its rear end with the shaft and the brace-bar and having its forward portion threaded and extended through the said apertured projection on the plate, a nut mounted on the threaded portion of the stay-bar in front of the said projection, and saddles straddling and connected with the shaft and engaging the stay-bar to hold the latter against lateral movement.

2. The combination with the heel portion of a vehicle shaft, and a cross-bar connected to said shaft, of an inclined brace bar disposed under the shaft and connected at its ends therewith, a T-plate connected with and arranged on the shaft and cross-bar and also connected with the forward portion of the brace bar and having an apertured projection, a stay-bar arranged above and curved correspondingly to the shaft and connected at its rear end with the shaft and the brace bar and having its forward portion extending through the apertured projection on the T-plate, a nut mounted on the threaded portion of the stay-bar in front of the said projection, and saddles straddling and connected with the shaft and engaging the stay-bar to hold the latter against lateral movement.

3. The combination with the heel portion of a vehicle shaft, of an inclined brace bar disposed under the shaft and having a T-head at its rear end on which is a teat to engage the shaft iron, a plate arranged on the shaft and having an apertured projection; said plate being bolted to the shaft and the forward portion of the brace bar, a stay-bar arranged above and curved correspondingly to the shaft and having a clip or shackle at its rear end straddling the shaft and connected with said T-head and also having a teat on said clip or shackle engaging the shaft and further having its forward portion threaded and extended through the said apertured projection on the plate, a nut mounted on the threaded portion of the stay-bar in front of the said projection, and saddles straddling and connected with the shaft and engaging the stay-bar to hold the latter against lateral movement.

4. The combination with the heel portion of a vehicle shaft, of an inclined brace bar disposed under the shaft and having a T-head at its rear end, a plate arranged on the shaft and having an apertured projection; said plate being connected with the shaft and the forward portion of the brace bar, a stay-bar arranged above and curved correspondingly to the shaft and having a clip or shackle at its rear end straddling the shaft and connected with said T-head, and also having its forward portion threaded and extended through the said apertured projection on the plate, a nut mounted on the threaded portion of the stay-bar in front of the said projection, and saddles straddling and connected with the shaft and engaging the stay-bar to hold the latter against lateral movement.

5. The combination of the curved heel portion of a vehicle shaft, a curved stay-bar arranged above and separated by an intervening space from the said heel portion and connected at its rear end with the said heel portion, an adjustable connection between the forward end of the stay-bar and the heel portion of the shaft, and means interposed between the heel portion of the shaft and the stay-bar and arranged to hold the latter.

6. The combination of the curved heel portion of a vehicle shaft, a curved stay-bar arranged above and separated by an intervening space from the said heel portion and connected at its rear end with the said heel portion, an adjustable connection between the forward end of the stay-bar and the heel portion of the shaft, means interposed between the heel portion of the shaft and the stay-bar and arranged to hold the latter, and an inclined brace bar disposed under the heel portion of the shaft and connected at its ends with said heel portion of the shaft and the stay-bar.

7. The combination with the heel portion of a vehicle shaft, of a stay-bar arranged above and curved correspondingly to the shaft and connected at its ends therewith and having an opening at an intermediate point of its length, a saddle arranged on the shaft and having a portion disposed in the said opening of the stay-bar, and a bolt extending through the saddle and connecting the same with the shaft.

8. The combination of the heel portion of a vehicle shaft, a stay-bar arranged above and curved correspondingly to said heel portion and separated by an intervening space from the heel portion and connected at its ends therewith, a transversely-disposed saddle straddling the heel portion of the shaft and interposed between the same and the stay-bar and arranged to hold the stay-bar against lateral movement, and means connecting the saddle and stay-bar.

In testimony whereof I have hereunto set my hand in presence of two subscribing witnesses.

LOUIS BURG.

Witnesses:
JOHN F. CLOVER,
EDW. HUBER.